(12) United States Patent
Probst

(10) Patent No.: US 6,845,998 B2
(45) Date of Patent: Jan. 25, 2005

(54) BICYCLE FRAME

(75) Inventor: Bodo Probst, Gross Umstadt (DE)

(73) Assignee: Fusion Bikes GmbH, Rogdau (DE)

( * ) Notice: Subject to any disclaimer, the term of this patent is extended or adjusted under 35 U.S.C. 154(b) by 14 days.

(21) Appl. No.: 10/414,401

(22) Filed: Apr. 16, 2003

(65) Prior Publication Data

US 2004/0094933 A1 May 20, 2004

(30) Foreign Application Priority Data

Nov. 18, 2002 (DE) .................................. 202 17 875 U

(51) Int. Cl.[7] .............................................. B62K 1/00
(52) U.S. Cl. ..................... 280/284; 280/275; 280/285
(58) Field of Search ................... 280/283–286, 280/288, 275

(56) References Cited

U.S. PATENT DOCUMENTS

| | | | | | |
|---|---|---|---|---|---|
| 5,611,557 | A | * | 3/1997 | Farris et al. ................. | 280/275 |
| 5,628,524 | A | * | 5/1997 | Klassen et al. ............. | 280/284 |
| 5,857,473 | A | * | 1/1999 | Vanover et al. ............. | 134/135 |
| 5,921,572 | A | * | 7/1999 | Bard et al. .................. | 280/284 |
| 6,036,213 | A | * | 3/2000 | Busby ......................... | 280/284 |
| 6,102,421 | A | * | 8/2000 | Lawwill et al. ............. | 280/284 |
| 6,131,934 | A | * | 10/2000 | Sinclair ....................... | 280/284 |
| 6,161,858 | A | * | 12/2000 | Tseng ....................... | 280/281.1 |
| 6,164,676 | A | * | 12/2000 | Wilcox ........................ | 280/284 |
| 6,170,845 | B1 | * | 1/2001 | Tseng ......................... | 280/284 |
| 6,244,610 | B1 | * | 6/2001 | Kramer-Massow ......... | 280/283 |
| 6,293,574 | B1 | | 9/2001 | Storck ......................... | 280/284 |
| 6,439,593 | B1 | * | 8/2002 | Tseng ......................... | 280/284 |
| 6,450,520 | B1 | * | 9/2002 | Girard ......................... | 280/284 |
| 6,595,538 | B2 | * | 7/2003 | Ellsworth et al. ........... | 280/284 |

* cited by examiner

*Primary Examiner*—Lesley D. Morris
*Assistant Examiner*—L. Lum
(74) *Attorney, Agent, or Firm*—Dennison, Schultz, Dougherty & MacDonald

(57) ABSTRACT

The invention concerns a bicycle frame (10) comprising a main frame (12), consisting of a seat pipe (24), a down tube (20) and a top tube (18) as well as a rear structure (14) with a pair of chain cross bars (46) and a pair of saddle cross bars (56) which are connected with their rear ends (50, 58) to an end run (54) each for the installation of a rear wheel axis, whereby the chain cross bars (46) are linked with their front ends (18) to a first fixed frame linkage point (40) of a main frame (12) and a see-saw equipped with three see-saw linkage points (60, 66, 68), which are a first see-saw linkage point (60) which is connected with the front ends (60) of the seat cross bars (56), a second see-saw linkage point (66) that is linked pivotally to a second fixed frame linkage point (42) of the main frame (12) and a third see-saw linkage point (68) that is pivotally connected with a first end (70) of a spring cushioning element (72). In order to achieve a delayed response of the suspension and to at least limit the undesired see-sawing of the rear structure, it is planned that the spring cushioning element (72 is connected with its second end (74) of the chain cross bar bracket (78) extending from the rear end (48) of the chain cross bars (46).

11 Claims, 2 Drawing Sheets

BICYCLE FRAME

BACKGROUND OF THE INVENTION

The invention refers to a bicycle frame comprising a main frame consisting of a seat tube, a down tube and a top tube, a rear structure with a couple of chain crossbars and a pair of saddle crossbars that are connected with their rear ends each with an end run for linkage to the rear axles, whereby the chain crossbars are each linked at their front ends with a first fixed linkage point of the main frame as well as a see saw equipped with three see saw linkage points. The first see saw linkage point is connected to the front end seat crossbar and the second see saw linkage point is linked pivotally to a second fixed linkage point of the main frame while a third linkage point is connected pivotally to the first end of a spring cushioning element.

Such a bicycle frame is known, for example from EP 0 912 391 B1. However, a second end of the spring cushioning element has a fixed connection with the main frame.

Such frame constructions are called in practice multiple joint frames or four-joint frames. In principle, the rear structure is connected via the front ends of the chain crossbars with a first fixed support in the area of the pedal bearing and via the front ends of the saddle bars with a seesaw mounted on the main frame, preferably on the seat tube that is connected with its first end of the spring cushioning element and whose second end is mounted to the main frame in known designs.

The known frame systems show a very direct responding behavior of the springs during pedaling lading to an especially undesired seesawing of the rear structures.

Therefore, it is the challenge of the present invention to further develop a bicycle frame of the above mentioned type to achieve a delayed responding behavior of the suspension and to at least severely limit undesired seesawing of the rear structure during pedaling.

BRIEF SUMMARY OF THE INVENTION

The problem is solved according to the invention with—among other things—a linkage of the front end of the spring cushioning element with a second end of the front end of the chain crossbar extending from the chain crossbar bracket. In contrast to the state of the art, the design according to the invention consists of a floating suspension of the spring cushioning element with a special feature so that the spring cushioning element can enforce the cushioning effect on both sides in the direction of the force effect leading to a delayed responding behavior of the suspension. This will severely curtail the undesired see sawing of the rear structure during pedaling.

DETAILED DESCRIPTION OF THE INVENTION

Figure 1:
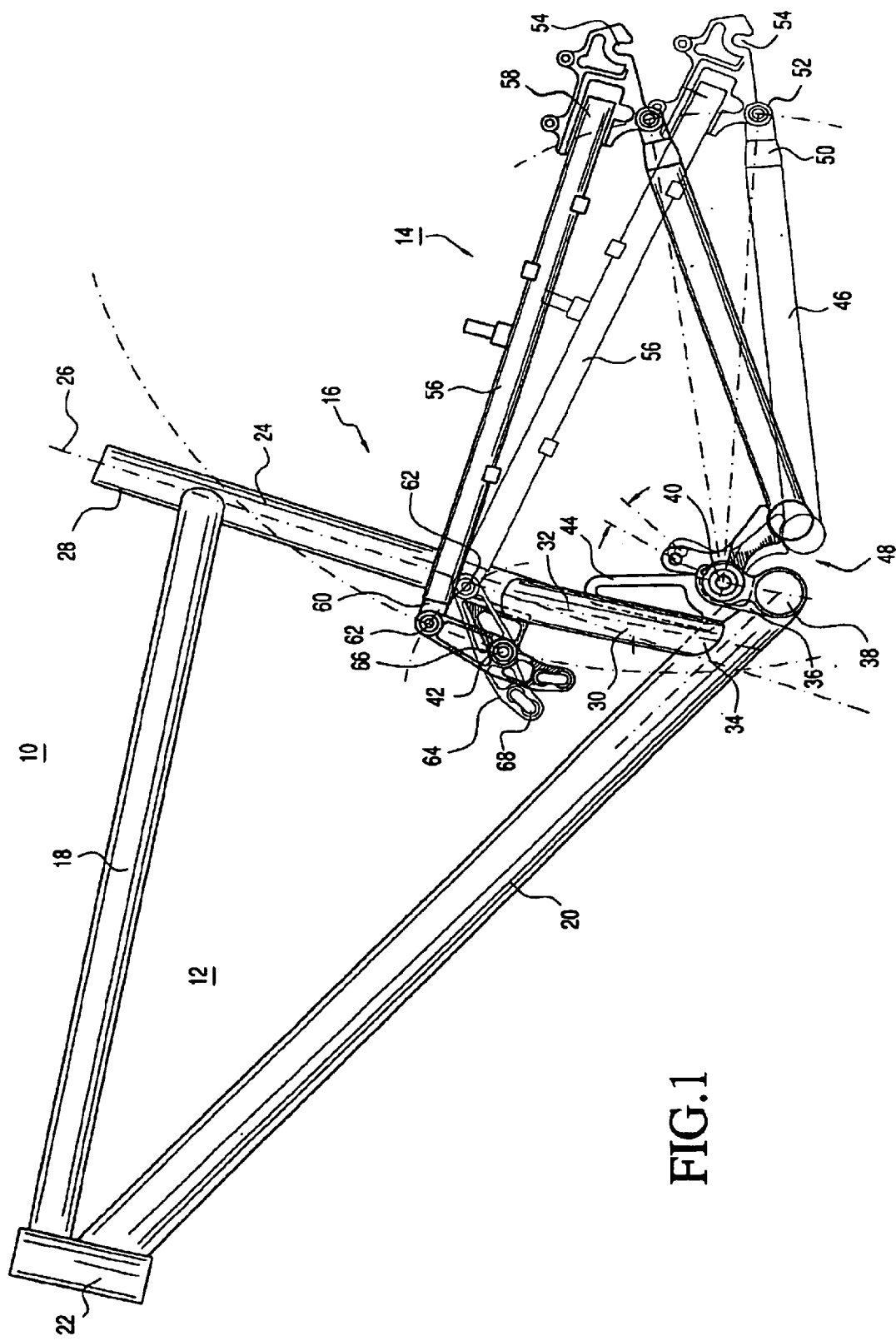
FIG. 1 Shows a schematic side view of a mountain bike frame with the rear structure suspension design according to the invention and FIG. 2 Shows a magnified depiction of a mountain bike frame in side view according to the invention.

The chain crossbar bracket extending from the front end of the chain crossbar has a chain crossbar linkage point that is mounted with the distance A from the centerline of the first fixed frame linkage point that lies between 30 mm$\leq$A$\leq$50 mm preferably A approximately 38 mm. The spring system can be designed with distance A according to the usage of the bicycle frame for different applications, such as downhill frame, free ride frame, or endurance frame. The longer the distance A is, the longer the delayed effect of the responding behavior.

A preferred design distinguishes itself in a parallel or essentially parallel installation of the spring cushioning element to the down tube. This results in an especially favorable center of gravity with a good protection of the spring cushioning element from mechanical influences or from soiling. The positioning of the spring cushioning element and the chain crossbar bracket achieves a very compact suspension system where even a lightweight leads to great rigidity.

In order to locate the spring cushioning element as close to the down tube as possible, another preferred design shows a segment of the seat tube connected with the sub-tube with a lead through for the spring cushioning element. The position of the spring cushioning element in the area above the pedal bearing close to the sub-tube leads to a very favorable center of gravity that also improves the bicycle features of the bicycle frame according to the invention.

For the mounting of the see saw, it is planned that the second fixed frame linkage point is located above the lead through located in the lower segment of the seat tube in a surface of the frame 12. In this design, the see saw is located on a surface between the down tube and the seat tube, which also guarantees a favorable center of gravity with good protection of the see saw element. In order to achieve the layout of the suspension system easily, it is planned to design the third see saw linkage point as a slotted hole. A distance B between the second see saw linkage point and the third see saw linkage point can thereby be adjusted in order to achieve a suspension adjustment of approximately 30 percent.

In one design of the rocker as a four-joint frame, it is planned that the rear ends of the chain crossbars be connected via a joint with the end runs and that the rear ends of the seat crossbars be tightly connected with the end runs. It should be noted that the floating bearing of the spring cushioning element can be used according to the invention for multiple joint systems as described above, as well as for four-joint systems, which are distinguished by the fact that an additional joint is located between the rocker bearings at the pedal bearing and the axis of the rear wheel.

In designs where the chain crossbars are connected with the end runs via a joint, it is planned that the first fixed frame linkage point located in the pedal bearing housing at the end of the down tube is located preferably above the pedal bearing housing whereby one of the center lines of the pedal bear housing and the connecting line of the first fixed frame linkage point are parallel or essentially parallel to the center line of the lower segment of the seat tube shifted towards the rear.

Additional details, advantages, and characteristics of the invention are not only shown in the claims, as well as the characteristics, individually and in combination, but also in the following description of one preferred design example depicted in the drawings.

FIG. 1 shows a purely schematic side view of a bicycle frame 10 preferably a mountain bike frame comprising a main frame 12, as well as a rear structure 14. The main frame 12 consists of a seat tube 16, a top tube 18, a down tube 20, as well as a steering tube 22, via which the front ends of the top tube 18 and the down tube 20 are connected.

The seat tube 16 runs in an upper segment 24 along a center line 26 and has an upper link 28 for the installation of a saddle support (not shown). In a lower segment 30, the seat tube 16 runs backwards along a first center line 26 against the forward direction along a center line 32, which is inclined backwards and is connected with the lower end 34 and the sub-tube 20.

For the joint mounting of the rear structure 14 to the main frame 12, the main frame 12 is equipped in the area of the pedal bearing housing 38 with a first fixed frame linkage point 40, as well as a rocker bearing and a second fixed frame linkage point 42 at the seat tube 16 whereby the second fixed frame linkage point is located on a surface comprising a seat tube 16 in the upper tube 18 and the down tube 20.

To increase the rigidity of the frame between the lower segment 30 of the seat tube 16 and the lower end 36 of the down tube 20, a bracing element 44 is placed.

The rear structure 14 comprises a pair of chain crossbars 46 that are linked at a front end 48 to a first fixed frame linkage point 40 and with a second end 50 via a joint 52 with an end run 54 for the installation of the rear wheel axis (not shown). In addition, the rear structure 14 consists of a pair of seat crossbars 56 that are securely connected to a rear end 58 with the end run 54. A front end 60 of the seat crossbars 56 is connected with the first sea see saw point 62 of a see saw 64, and the see saw 64 is also pivotally connected to a second see saw point 66 and with a second fixed frame linkage point 42.

A third see saw point 68 is connected with a first end 70 of a spring cushioning element 72 whose second end 74 is connected with a pivotal chain crossbar linkage point 76 that is located on a chain crossbar bracket 78 extending from the front end 48 of the chain crossbar 46.

A distance A between the first fixed frame linkage point 40 and the pivotal chain crossbar linkage point 76 is preferably adjustable and facilitates an adjustment of the suspension systems for different applications of the bicycle frame 16, for example, as a downhill frame, free ride frame, or endurance frame, to achieve a fine adjustment of the delayed responding behavior of the suspension.

Transmission of the shock absorber to the total spring length of approximately 7:1 to 10:1 can be achieved. The remaining transmission of the shock absorbers will be achieved through the rocker movement of the level 64.

The spring-cushioning element 72 is located along the center line 80, which runs parallel or essentially parallel to a center line 82 of the down tube 20. The spring-cushioning element 72 leads through the lower segment 30 of the seat tube 16, comprising a lead through 84 in the lower segment 30, which is not shown, where the spring-cushioning element 72 is located. Through the position of the spring-cushioning element 72 parallel to the down tube 20 and surrounded by part of the seating tube 16, a very favorable center of gravity and good mechanical protection of the absorber is hereby achieved.

Furthermore, the design of the spring-cushioning element 72 and its layout at the chain crossbar bracket 78 according to the invention facilitates a compact structure achieving a high degree of rigidity at a low weight.

For additional adjustment of the suspension system, a third see saw linkage point 68 is designed as a slot so that a distance B can be adjusted between the first see saw linkage point 62 and the third see saw linkage point 68 in the range of preferably 80 mm≦B≦110 mm.

It is planned in the described design of the rear structure 14 as a multiple joint that the first fixed frame linkage point 40 is located essentially above the pedal bearing housing 38 at the end of the sub-tube 20 whereby the center line of the pedal bearing housing 38 and the first fixed linkage point 40 lie on a line 84 that is set back at a distance parallel to the center line 32 of the lower segment 30 of the seat tube 16.

Figure 2:
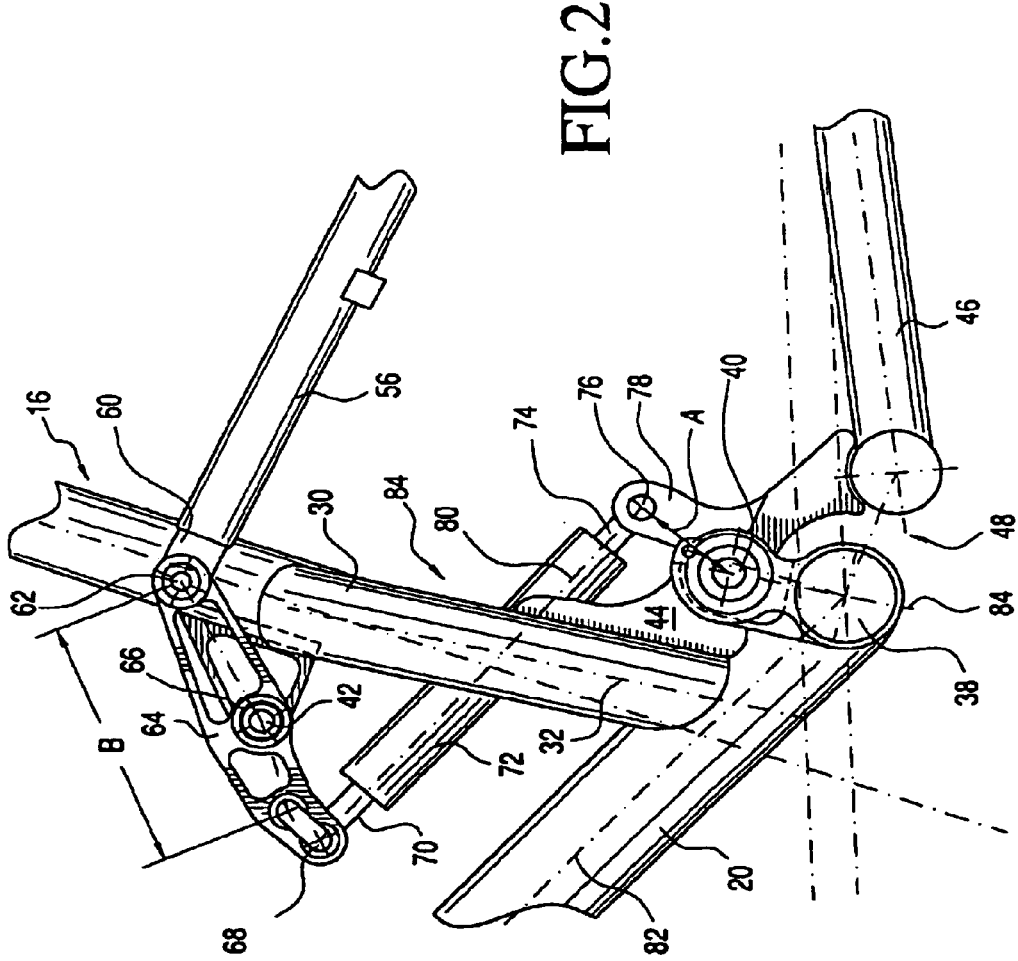

It should be noted separately that the floating suspension of the spring-cushioning element 72 is independent from the constructive layout of the first frame linkage point 40 so that the protected area shown in FIGS. 1 and 2 of the depicted design is not limited.

What is claimed is:

1. A bicycle frame (10) comprising a main frame (12), consisting of a seat tube (16), a down tube (20) and a top tube (18) as well as a rear structure (14) with a pair of chain crossbars (46) and a pair of seat crossbars (56);

said down tube (20) having a pedal bearing housing (38) at one end;

wherein the chain crossbars (46) and the seat crossbars (56) are each connected at a rear end (50, 58) to an end run (54);

wherein the chain crossbars (46) are each connected at a front end (48) to a first fixed frame linkage point (40) of the main frame (12);

wherein the seat crossbars (56) are each connected at a front end (60) to a see saw having three linkage points (62, 66, 68);

wherein a first see saw linkage point (62) is connected to the front ends (60) of a seat crossbars (56), the second see saw linkage point (66) is pivotally connected to a second fixed frame linkage point (42) of the main frame (12), and a third see saw linkage point (68) is pivotally connected to a first end (70) of a spring cushioning element (72); and wherein a second end (74) of the spring cushioning element (72) is connected to a chain cross bar bracket (78) extending from the front ends (48) of the chain crossbars (46).

2. A bicycle frame according to claim 1, wherein a distance (A) between a center of the first fixed frame linkage point (40) and a pivotal chain crossbar linkage point (78) is from 30 mm to 50 mm.

3. A bicycle frame according to claim 1, wherein the spring cushioning element (72) lies parallel or essentially parallel to the down tube (20).

4. A bicycle frame according to claim 1, wherein spring cushioning element (72) is connected to a lower segment (30) of the seat tube (16) by a lead through (84).

5. A bicycle frame according to claim 4, wherein the second fixed frame linkage point (42) is located above the lead through (84) in the lower segment (30) of the seat tube (16).

6. A bicycle frame according to claim 1, wherein the third see saw linkage point (68) is formed as a slot.

7. A bicycle frame according to claim 1, wherein a distance B between the first see saw linkage point (62) and the third see saw linkage point (68) lies within the range of 80 mm≦B≦100 mm.

8. A bicycle frame according to claim 1, wherein the rear ends (50) of the chain crossbars (46) are connected via a joint (52) to the end runs (54) and rear ends (58) of the seat crossbars (56) are fixedly connected to the end runs (54).

9. A bicycle frame according to claim 1, wherein the first fixed frame linkage point (40) lies adjacent the end (36) of the down tube (20) of the pedal bearing housing (38), and wherein a line bisecting a center of the pedal bearing housing (38) and a center of the first fixed frame linkage point (40) is parallel or essentially parallel to the lower segment (30) of seat tube (16).

10. A bicycle frame according to claim 9, wherein the first fixed frame linkage point (40) lies above the pedal bearing housing (38).

11. A bicycle frame according to claim 2, wherein distance A is 38 mm.

* * * * *